United States Patent
Dinkin et al.

(10) Patent No.: US 6,591,253 B1
(45) Date of Patent: Jul. 8, 2003

(54) METHOD AND SYSTEM FOR REAL TIME PRICING OF FINE-GRAINED RESOURCE PURCHASES

(75) Inventors: Sam Dinkin, Austin, TX (US); David LaPotin, Austin, TX (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,732

(22) Filed: Dec. 17, 1999

(51) Int. Cl.⁷ .............................................. G01R 11/56
(52) U.S. Cl. ...................................... 705/412; 165/238
(58) Field of Search ............................... 705/400, 412; 165/238–239

(56) References Cited

U.S. PATENT DOCUMENTS

| | | | |
|---|---|---|---|
| 5,237,507 A | * 8/1993 | Chasek | 364/464.04 |
| 5,289,362 A | * 2/1994 | Liebl et al. | 364/140 |
| 5,794,212 A | * 8/1998 | Mistr, Jr. | 705/26 |
| 5,924,486 A | * 7/1999 | Ehlers et al. | 165/238 |
| 5,926,776 A | 7/1999 | Glorioso et al. | 702/130 |
| 5,974,308 A | 10/1999 | Vedel | 455/407 |

FOREIGN PATENT DOCUMENTS

WO     WO 97/37503     * 10/1997           H04Q/7/22

OTHER PUBLICATIONS

Illinova Energy Partners Launches Weather Data Site for Customers of the Utility Manager, Oct. 21, 1997, 1999 PR Newswire Assoication Inc.*

* cited by examiner

*Primary Examiner*—James P. Trammell
*Assistant Examiner*—Mary Wang
(74) *Attorney, Agent, or Firm*—Casimer K. Salys; Bracewell & Patterson, L.L.P.

(57) ABSTRACT

A method and system for controlling the purchase of fine-grained resource purchases, such as utility resources or access to limited highway lanes. Real time pricing based upon current demand and/or usage is periodically determined. Access to that real time pricing information is obtained by individual users via a distributed computing network or radio frequency broadcast system and utilization of those resources is then locally controlled based upon that pricing information. Access to limited highway lanes may be priced based upon current actual utilization and pricing information is then broadcast, permitting users to selectively access those lanes based upon real time pricing decisions by those users.

14 Claims, 3 Drawing Sheets

METHOD AND SYSTEM FOR REAL TIME PRICING OF FINE-GRAINED RESOURCE PURCHASES

BACKGROUND OF THE INVENTION

1. Technical Field

The present invention relates in general to an improved method and system for real time pricing of fine-grained resources and in particular to an improved method and system for real time pricing of fine-grained resources utilizing a distributed computing network. Still more particularly, the present invention relates to an improved method and system for real time pricing of fine-grained resources which permits efficient and intelligent multi-parameter purchasing/consumption of fine-grained resources.

2. Description of the Related Art

Producers of goods and services typically set their prices in accordance with the cost of production and the expected demand for those goods or services. However, for a large class of producers, the cost of a particular item or class of service is dependent upon the demand for that item or class of service. For example, electrical utilities typically have a fixed maximum generating capacity. It is quite expensive for an electrical power generation station to be switched on and off and this consideration causes the incremental cost of electrical power to be quite low when the demand for electrical power is low. As the demand for electrical power increases, the incremental cost of energy rises. When demand is close to the maximum power generation capacity, the cost of additional electrical energy becomes quite high, resulting in a demand for the construction of increased generation capacity and a requirement for electrical power generation stations to preemptively disconnect consumers from the electrical power distribution network.

Traditionally, this problem has been addressed by relying upon a pricing scheme which takes anticipated demand into account. For example, during the summer when high air conditioning costs are expected electrical power costs are set higher than during the winter. Similarly, gasoline prices rise during the summer months in anticipation of increased consumption by drivers. However, since both of these solution rely upon the prediction of future demand, they can lead to significantly flawed pricing models.

One solution to this problem is a real time pricing model in which the price is dynamically adjusted periodically to match demand for the goods or services. One example of this model is short term trading on the stock exchange. Barring news that substantially changes the inherent value of the stock of a particular company, the price of that stock is directly related to the demand for that stock. Another example of this pricing model is telecommunications network capacity auctions which are provided in real time by companies like Arbinet, at "www.arbinet.com."

Real time pricing models currently exist in situations where a large quantity of a resource exchanges hands. In both stock markets and telecom network capacity auctions, the buyers and sellers meet at an exchange to trade large quantities of stocks and telecommunication capacity. The inherent efficiencies of real time pricing models make them extremely attractive. However, the overhead of real time price management introduces considerable difficult in extending this model to situations where small quantities of resources are bought and sold.

Glorioso, et al., U.S. Pat. No. 5,926,776 discloses one system in which the consumption of electrical power is controlled by price points. A smart thermostat is utilized having a transceiver for two-way communication with the energy provider. The smart thermostat includes a temperature sensor for measuring a temperature, a user interface for displaying and receiving information to and from the user, a port connecting the thermostat to a cooling or heating device, a processor and a transceiver. The transceiver receives a current energy price from an energy provider and the user interface receives temperature set points and associated acceptable energy costs. The processor then issues a control signal to the cooling or heating device to operate when the temperature is different than the temperature set point and the acceptable energy cost is not greater than the current price of energy. Information regarding the temperature set points and associated costs are transmitted by the transceiver from the smart thermostat to the energy provider which may then predict the effect that a change in the current energy price will have on energy demand. The user interface may also display a bill for the accumulated use of energy either calculated by the processor or downloaded from the energy provider for utilization by the user.

Similarly, U.S. Pat. No. 5,974,308, issued to Vedel discloses a cellular telephone system which optimizes user demand by charging the system subscribers according to a variable charge rate based upon utilization of each cell within the system by subscribers. The service provider monitors the load in each cell within the cellular system and for each cell a continuously determined charge rate is tailored to specific subscriber categories according to a number of variables which are optimized for an individual cell's capacity and overall system capacity.

While both of these aforementioned systems describe techniques for varying the real time price of a commodity, both of these techniques are directed to systems which permit the supplier of the commodity to vary the price for that commodity based upon accurate presumptions regarding utilization of that commodity in order to bring additional accuracy to the prediction of future demand and increase the accuracy of pricing models. However, neither of these systems shows or suggests a method or system whereby a user may efficiently and accurately utilize the resultant pricing data to accurately control the purchasing and/or consumption of the goods or services. Consequently, those skilled in the art should appreciate that a need exists for a method and system whereby a user may efficiently and intelligently purchase and consume various fine-grained resources based upon multi-parameter decisions rules.

SUMMARY OF THE INVENTION

It is therefore one object of the present invention to provide an improved method and system for real time pricing of fine-grained resources.

It is another object of the present invention to provide an improved method and system for real time pricing of fine-grained resources which utilizes a distributed computing network.

It is yet another object of the present invention to provide an improved method and system for real time pricing of fine-grained resources which permits efficient and intelligent multi-parameter purchasing/consumption decisions to be made.

The foregoing objects are achieved as is now described. A method and system are disclosed for controlling the purchase of fine-grained resource purchases, such as utility resources or access to limited highway lanes. Real time pricing based upon current demand and/or usage is periodically determined. Access to that real time pricing information is obtained by individual users via a distributed computing network or a radio frequency broadcast system and utilization of those resources is then locally controlled based upon that pricing information. Access to limited highway lanes may be priced based upon current actual utilization and pricing information is then broadcast, permitting users to selectively access those lanes based upon real time pricing decisions by those users.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
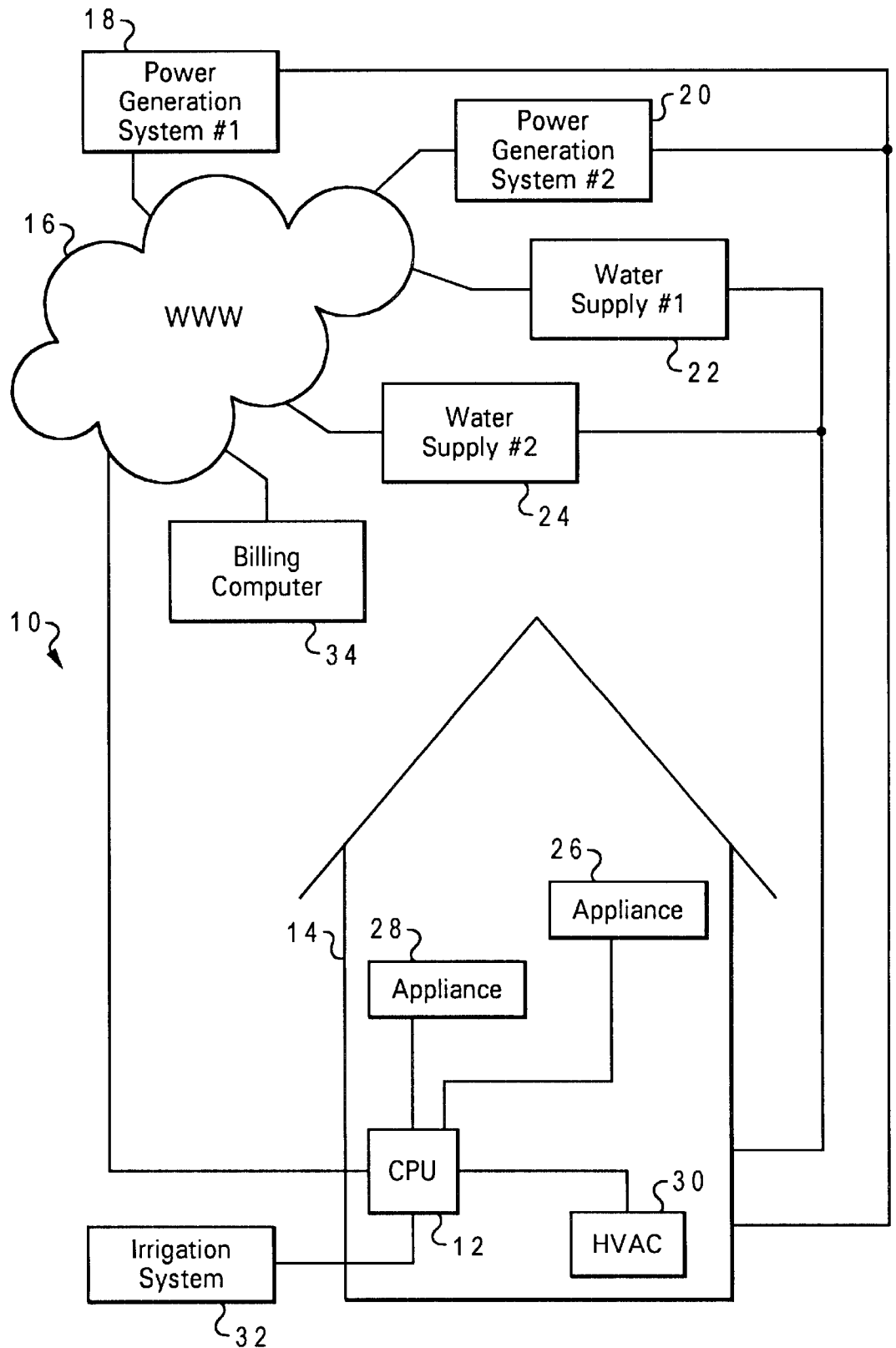
FIG. 1 is a partially schematic, pictorial view of a system for real time pricing of fine-grained resource purchases in accordance with a preferred embodiment of the present invention.

With reference now to the figures and in particular with reference to FIG. 1, there is depicted a partially schematic, pictorial view of a system 10 for real time pricing of fine-grained resource purchases in accordance with a preferred embodiment of the present invention. As depicted, system 10 includes a central processing unit 12 which is depicted within a user location 14. Those having skill in this art will appreciate that central processing unit 12 may comprise any suitable programmable processor such as, for example, a personal computer, minicomputer or even an appropriately programmed dedicated processor constructed integrally within user location 14.

As depicted, central processing unit 12 includes communication capacity or modem for communicating with the outside world including a so-called wide area network (WAN) such as the World Wide Web, depicted at reference numeral 16.

In accordance with an important feature of the present invention, also coupled to wide area network 16 are power generation system number one, indicated at reference numeral 18, power generation system number two, indicated at reference numeral 20, water supply number one, indicated at reference numeral 22, water supply number two, indicated at reference numeral 24 and a natural gas supply indicated at reference numeral 36. Additionally, billing computer 34 is shown coupled to wide area network 16 in a manner which will be explained in greater detail below.

Referring again to user location 14, it may be seen that user location 14 includes multiple appliances including appliance 26 and 28 which may comprise various appliances typically found within the user's home such as, for example, dishwashers, hot water heaters or the like. Similarly, heating ventilation and air conditioning (HVAC) system 30 and irrigation system 32 are also depicted as associated with user location 14. As illustrated, natural gas supply 36 and the various power generation systems and water supply systems are each coupled to user location 14 in a manner well known to those having skill in these arts.

Figures 2, 4:
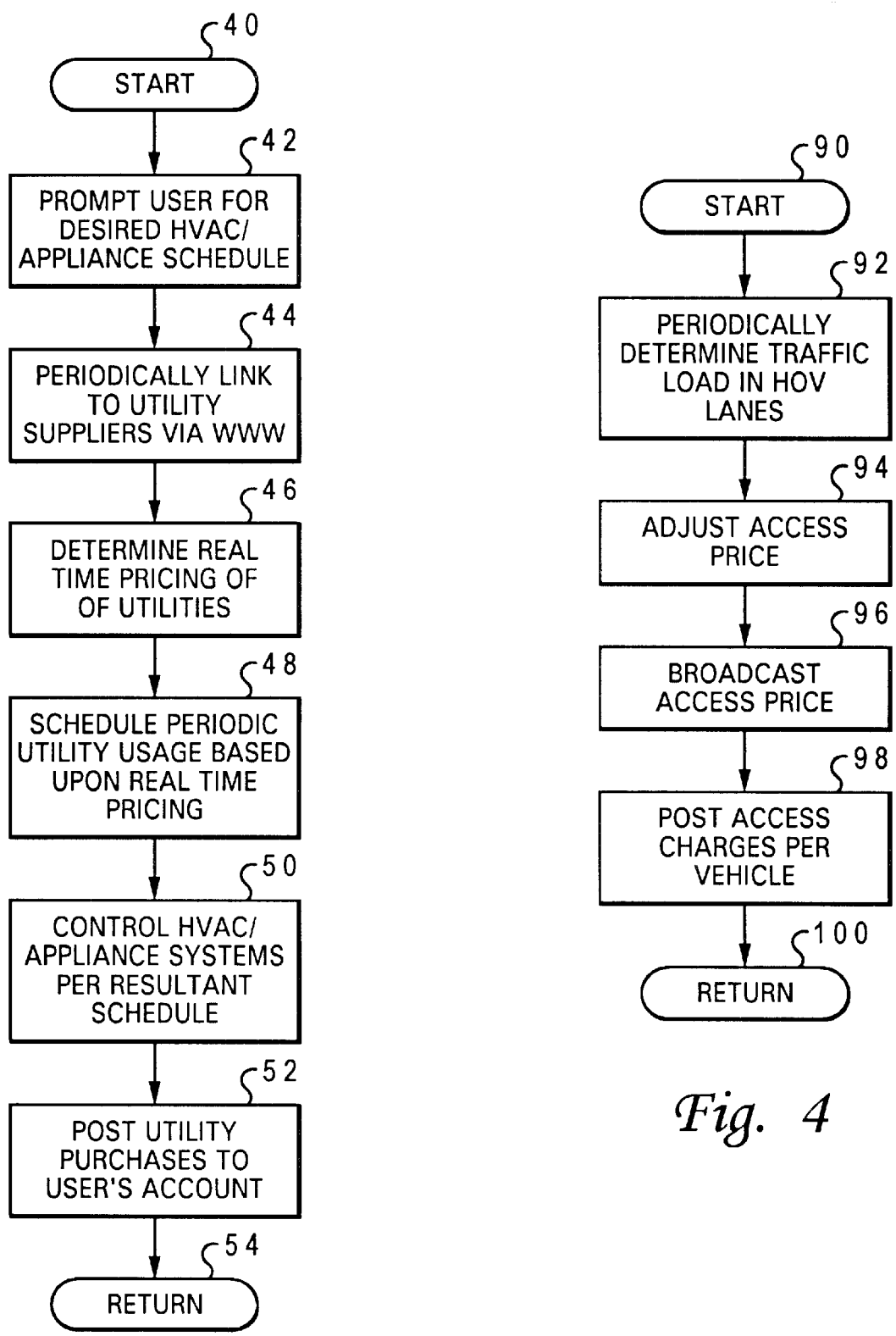
FIG. 2 is a high-level logic flowchart of the process for utilizing the system of FIG. 1.
FIG. 4 is a high-level logic flowchart of the process for utilizing the system of FIG. 3.

Referring now to FIG. 2, there is depicted a high-level logic flowchart of the process for utilizing the system of FIG. 1. Continued reference will also be made to FIG. 1. As illustrated, this process begins at block 40 and thereafter passes to block 42 which depicts the prompting of a user for a desired HVAC/appliance schedule. In this manner, the user may program a time schedule, temperature set points or the like into central processing unit 12 in its embodiment as a home computer or into the central processing unit portion of a controller associated with a so-called "smart house."

Next, the process passes to block 44. Block 44 illustrates the periodic linking of central processing unit 12 to various utility suppliers via a wide area network, such as the world wide web, depicted at reference numeral 16 within FIG. 1. The process then passes to block 46.

Block 46 illustrates the determination of real time pricing for the various utilities depicted within FIG. 1. By real time pricing, what is meant is the price set by the provider of various goods or services for a fixed interval of time or a fixed amount of those goods or services. Of course, as described above, the model utilized by the provider of these goods or services may be adaptive in nature and thus, the pricing information for the goods or services may vary dramatically over relatively short periods of time.

Additionally, it is contemplated that the determination of real time pricing of the utilities whose suppliers are coupled to the world wide web may contemplate more than a simple downloading of a current price from those utilities. For example, pricing information may include a variable price over multiple service quality levels. For utility services these multiple service quality levels may include differing levels of interruptibility, or various maximum or minimum flows. Further, a pricing algorithm may be present within central processing unit 12 which attempts to predict the pricing of various goods or services based upon the current price of those goods or services from multiple sources for those goods or services, and known statistical information including: current environmental and temperature readings; historical variations in utilization data; and, possible political upheaval in those areas where the various resources are produced. In this manner, it is contemplated that central processing unit 12 (see FIG. 1) may utilize a sophisticated pricing algorithm to determine the current and likely future price of various goods or services by utilizing a sophisticated pricing algorithm in combination with communications containing current pricing for those goods or service from one or more source.

Next as depicted at block 48, the periodic usage or consumption of those utilities is scheduled by central processing unit 12, based upon the real time pricing, both current and predicted. In this manner, for example, it may be possible to utilize central processing unit 12 to vary the start time for an appliance, such as a dishwasher, until such time as the cost of water and electricity reach a daily minimum. Further, it is contemplated that various dual fuel source appliances may be utilized and the selection of a particular appliance may be varied based upon the dynamically determined cost for the utility which powers that appliance. For example, HVAC system 30 may include both a natural gas furnace and an electric heat pump unit and a decision regarding which of these device is initiated will be based dynamically upon the determined and predicted price for natural gas and electricity in accordance with the method and system of the present invention. Of course, as noted above, provision of electrical power or water, for example, by multiple providers can also result in variations in a price which can be utilized by the pricing algorithm within central processing unit 12.

Thereafter, as illustrated at block 50, the HVAC system and appliance systems are controlled utilizing central processing unit 12 in accordance with the schedule determined above. Finally, the purchases of the various resources are posted to the user's account utilizing billing computer 34.

Figure 3:
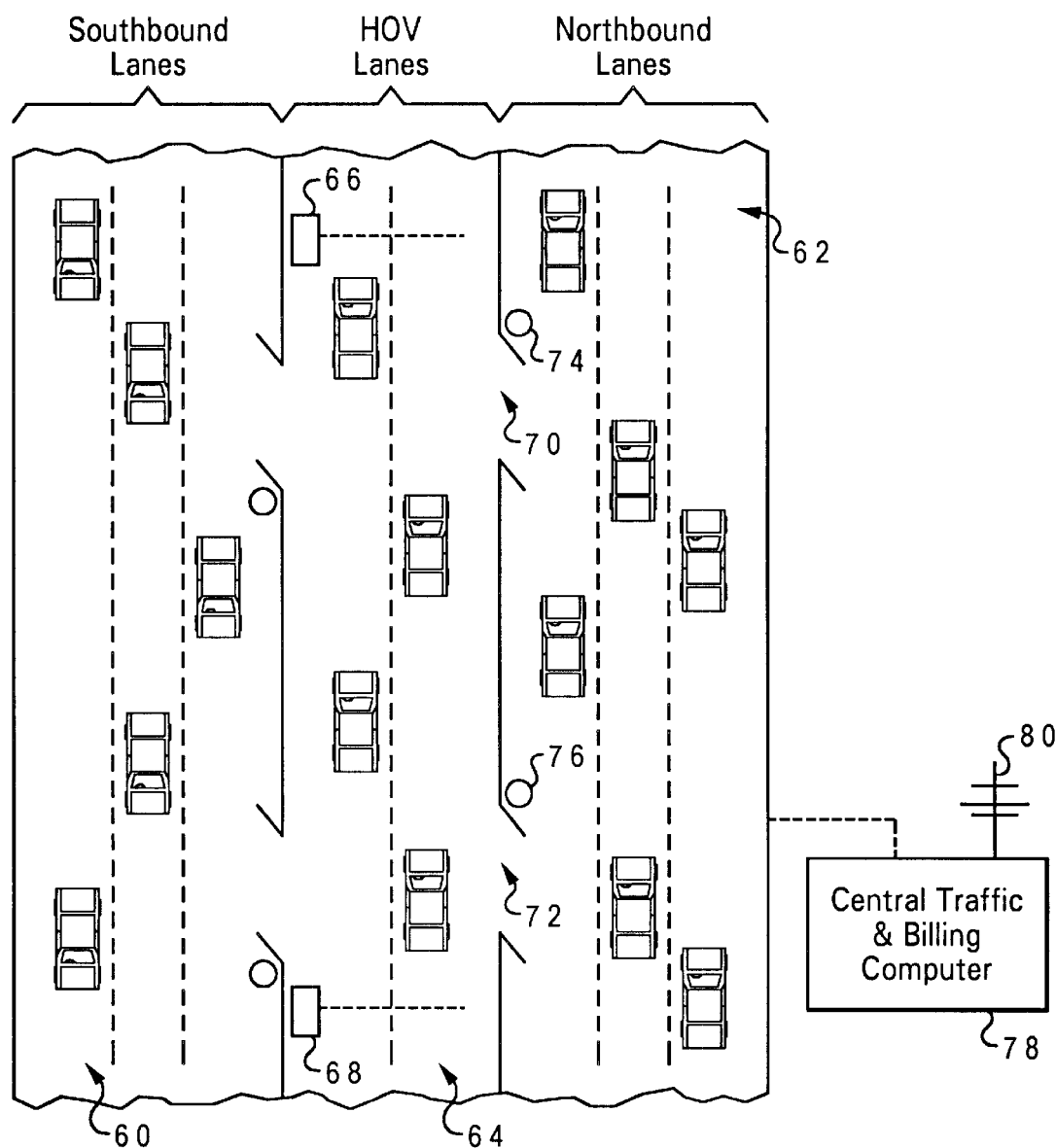
FIG. 3 is a partially schematic, pictorial view of a system for real time pricing of high occupancy vehicle (HOV) highway lane access in accordance with the method and system of the present invention.

With reference now to FIG. 3, there is depicted a partially schematic pictorial view of a system for real time pricing of high occupancy vehicle (HOV) highway lane access in accordance with the method and system of the present invention.

Many modern cities include multi-lane freeways which include a reversible high occupancy lanes which are reserved for utilization by vehicles carrying more than a preset number of passengers. These lanes are often under utilized for lack of a sufficient number of vehicles that meet the appropriate criteria. Consequently, it would be useful to provide a method and system for dynamically calculating the capacity of these lanes and setting a price for utilization thereof.

As illustrated in FIG. 3, the highway system graphically depicted includes southbound lanes 60, northbound lanes 62 and high occupancy vehicle (HOV) lanes 64. In accordance with the depicted embodiment of the present invention, the amount of traffic presently within high occupancy vehicle (HOV) lanes 64 is periodically and dynamically determined utilizing well known traffic sensor devices, such as traffic sensors 66 and 68. These devices determine the number of vehicles passing over a roadway surface during a specific period of time by detecting the presence of large metallic objects within the range of an inductive circuit, or utilizing other technology, such as optical technology.

Traffic loading information from traffic sensors 66 and 68 is then coupled to central traffic and billing computer 78. In a period of time during which high occupancy vehicle (HOV) lanes 64 are underutilized, the appropriate access lanes for traffic in that direction may be opened to non-qualified vehicles. For example, access lanes 70 and 72 permit traffic from north bound lanes 62 to enter high occupancy vehicle (HOV) lanes 64.

However, it is important that the utilization of these lanes be priced dynamically based upon the amount of additional traffic desired for these lanes. Consequently, based upon various traffic models and the traffic load present within high occupancy vehicle (HOV) lanes 64, central traffic and billing computer 78 calculates an access charge for those lanes which is then, in the depicted embodiment, periodically broadcast via radio frequency systems over broadcast antenna 80.

Vehicles within north bound lanes 62 who desire access to high occupancy vehicle (HOV) lanes 64 may then enter those lanes via access lanes 70 and 72 and may be identified via tag sensors 74 and 76. Tag sensors 74 and 76 are utilized in a manner well known to those having skill in this particular art, to detect and identify particular users passing through access lanes 70 and 72 so that access charges for utilization of high occupancy vehicle (HOV) lanes 64 may be posted to credit card accounts for those users.

Finally, referring to FIG. 4, there is depicted a high level logic flowchart of the process for utilizing the system of FIG. 3. As illustrated, this process begins at block 90. Thereafter, as described above, the traffic load within high occupancy vehicle (HOV) lanes 64 is periodically determined utilizing, for example, traffic sensors 66 and 68.

Next, the access price for access to high occupancy vehicle (HOV) lanes 64 is determined. Of course, in situations in which the traffic load within high occupancy vehicle (HOV) lanes 64 exceeds some predetermined level the access price may be set at infinity, effectively prohibiting the entry of additional vehicles which do not meet the high occupancy vehicle (HOV) criterion.

Next, as depicted at block 96, the access price is periodically broadcast, permitting the highway authority to dynamically alter the access price for access to these lanes in a manner reflective of the current access utilization of those lanes.

Finally, as depicted at block 98, the access charges for each vehicle entering high occupancy vehicle (HOV) lanes 64 are posted to user's account utilizing tag sensors 74 and 76 as described above. The process then passes to block 100 and returns.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described within reference to FIGS. 2 and 4 can be accomplished with a computer-aided device. In such a method, data stored in a memory unit of a data-processing system such as a data-processing system, can represent steps in a method for implementing a preferred embodiment of the present invention.

Upon reference to the foregoing, those skilled in the art will appreciate that the present application describes a method and system whereby the purchase and consumption of fine-grained resources may be intelligently and accurately adjusted based upon real time pricing data which may be dynamically determined and adjusted utilizing a sophisticated pricing algorithm of the user's choice. In this manner, real time pricing models may be extended to situations where a relatively small quantities of resources are purchased in a fine-grained fashion by an end consumer in an intelligent and efficient manner.

While the invention has been particularly shown and described with reference to a preferred embodiment, it will be understood by those skilled in the art that various changes in form and detail may be made therein without departing from the spirit and scope of the invention.

What is claimed is:

1. A method for real time pricing of fine-grained resource purchases, said method comprising the steps of:
   periodically determining real time pricing for a fine-grained resource utilizing a distributed computing network;
   providing a price to a user for said fine-grained resource prior to purchase to allow said user to know the price prior to purchase, wherein said price is the actual cost of said fine-grained resource;
   scheduling local utilization of said fine-grained resource by said user in response to variations in said real time pricing; and
   posting charges for purchase of said fine-grained resource to said user.

2. The method for real time pricing of fine-grained resource purchases according to claim 1, wherein said step periodically determining real time pricing for a fine-grained resource utilizing a distributed computing network comprises the step of periodically accessing real time pricing data for a fine-grained resource from a plurality of sources for said fine-grained resource utilizing a distributed computing network.

3. The method for real time pricing of fine-grained resource purchases according to claim 1, wherein said step of periodically determining real time pricing for a fine-grained resource utilizing a distributed computer network comprises the step of periodically determining real time pricing for a fine-grained resource utilizing current price data obtained via a distributed computing network and a prediction of future trends of said price.

4. The method for real time pricing of fine-grained resource purchases according to claim 1, wherein said step of periodically determining real time pricing for a fine-grained resource utilizing a distributed computer network comprises the step of periodically determining real time pricing for a fine-grained resource over a plurality of service quality levels utilizing a distributed computer network.

5. The method for real time pricing of fine-grained resource purchases according to claim 4, wherein said step of periodically determining real time pricing for a fine-grained resource over a plurality of service quality levels utilizing a distributed computer network comprises the step of periodically determining real time pricing for a fine-grained resource over a plurality of service quality levels which include interruptibility or specified maximum or minimum purchases utilizing a distributed computer network.

6. The method for real time pricing of fine-grained resource purchases according to claim 1, wherein said step of scheduling local utilization of said fine-grained resource by a user in response to variations in said real time pricing comprises the step of controlling initiation of devices which consume said fine-grained resource at a user's location in response to variations in said real time pricing.

7. A system for real time pricing of fine-grained resource purchases, said system comprising:
   communication means for periodically determining real time pricing for a fine-grained resource utilizing a distributed computing network;
   communication means for providing a price to said user for said fine-grained resource prior to purchase to allow said user to know the price prior to purchase, wherein said price is the actual cost of said fine-grained resource;
   controller means for scheduling local utilization of said fine-grained resource by said user in response to variations in said real time pricing; and
   billing means for posting charges for purchase of said fine-grained resource to said user.

8. The system for real time pricing of fine-grained resource purchases according to claim 7, wherein said communication means for periodically determining real time pricing for a fine-grained resource utilizing a distributed computing network comprises communication means for periodically accessing real time pricing data for a fine-grained resource from a plurality of sources for said fine-grained resource utilizing a distributed computing network.

9. The system for real time pricing of fine-grained resource purchases according to claim 7, wherein said communication means for periodically determining real time pricing for a fine grained resource utilizing a distributed computing network comprises communication means for periodically accessing real time pricing data for a fine-grained resource via a distributed computing network and for predicting future trends of said price.

10. The system for real time pricing of fine-grained resource purchases according to claim 7, wherein said controller means further includes means for controlling initiation of devices which consume said fine-grained resource at a user's location in response to variations in said real time pricing.

11. A system for real time pricing of utility resources, said system comprising:
    a local communication device for periodically determining real time pricing of utility resources utilizing a distributed computing network and for providing said real time pricing of utility resources to individual users prior to purchase thereof;
    controller means for scheduling local devices which utilize said utility resource in response to individual user inputs and variations in said real time pricing of said utility resources; and
    billing means for posting charges for purchases of utility resources by individual users.

12. The system for real time pricing of utility resources according to claim 11, wherein said utility resources comprise electrical power and wherein said controller means includes interface means for initiating local electrical appliances in response to variations in said real time pricing of said electrical power.

13. The system for real time pricing of utility resources according to claim 11, wherein said distributed computing network comprises the world wide web.

14. The system for real time pricing of utility resources according to claim 11, wherein said utility resources comprise two different types of utilities and wherein said controller means includes interface means for initiating variable fuel operation within local appliances in response to variations in said real time pricing of said utility resources.

* * * * *